Figures 1, 2:
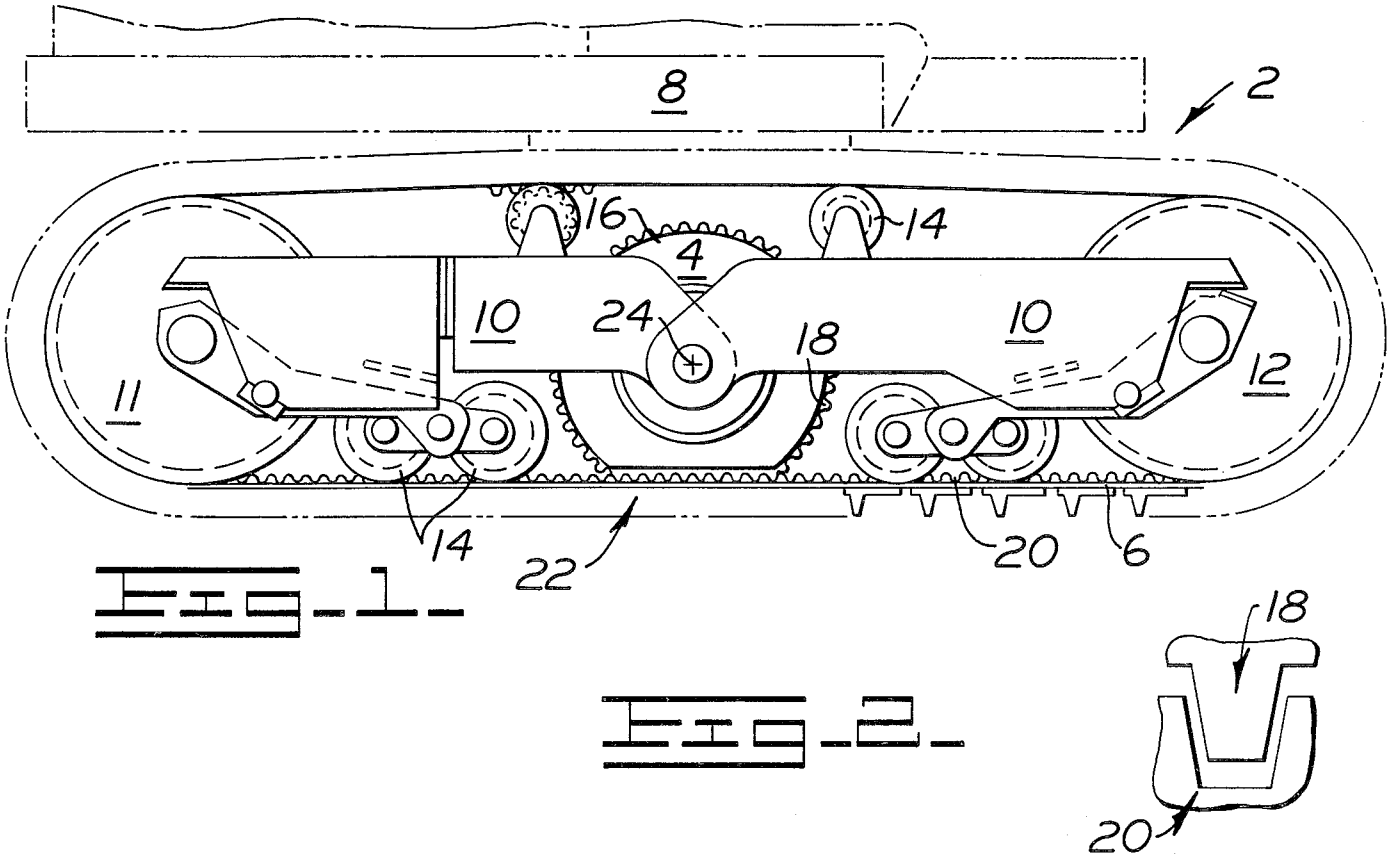

United States Defensive Publication [19] (H) [11] T980,006

Livesay [43] Mar. 6, 1979

[54] TIRE AND CONTINUOUS TRACK SYSTEM

[75] Inventor: Richard E. Livesay, Peoria, Ill.

[73] Assignee: Caterpillar Tractor Co., Peoria, Ill.

[21] Appl. No.: 899,210

[22] Filed: Apr. 24, 1978

[51] Int. Cl.[2] ..... B62D 55/12

[52] U.S. Cl. ..... 305/34

[57] ABSTRACT

A track assembly has a continuous track and a tire is provided in contact with the track. A plurality of protrusions extends from one of the track and tire, and openings extend into the other of the track and tire. These protrusions and openings are mateable one within the other. The mating elements can be a multiplicity of configurations.

Rotation of the tire by a power source progressively engages protrusions and openings, and the track is driven, as might be employed as drive mechanism for a track-type vehicle. The tire, for example, can be a pneumatic tire, preferably a tire of the beadless type.

The flexible properties of the tire eliminates the need for a fixed distance between the track and drive axle and increases the contact area between the tire and track driving elements. Further, noise is reduced in the track system and the tire can provide an air suspension for the vehicle.

1 Claim, 1 Sheet Drawing,

4 Pages Specification

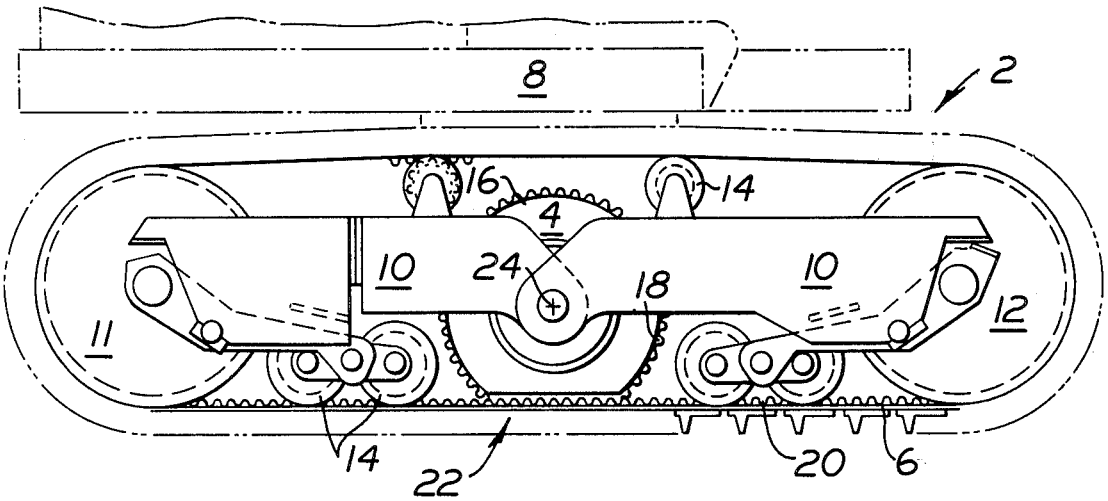

The file of this unexamined application may be inspected and copies thereof may be purchased (849 O.G. 1221, Apr. 9, 1968).